United States Patent
Matsuura et al.

(10) Patent No.: US 6,778,233 B2
(45) Date of Patent: Aug. 17, 2004

(54) METHOD FOR DARKENING PIXEL

(75) Inventors: Yoshiaki Matsuura, Gifu (JP); Yasuo Segawa, Gifu (JP); Masahiko Tokunaga, Gifu (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/995,135

(22) Filed: Nov. 27, 2001

(65) Prior Publication Data

US 2002/0063844 A1 May 30, 2002

(30) Foreign Application Priority Data

Nov. 28, 2000 (JP) .................................. 2000-361001

(51) Int. Cl.⁷ .......................... G02F 1/13; G02F 1/1333
(52) U.S. Cl. ...................................... 349/54; 349/192
(58) Field of Search .............................. 349/54–55, 192

(56) References Cited

U.S. PATENT DOCUMENTS

| | | | | | |
|---|---|---|---|---|---|
| 5,166,085 A | * | 11/1992 | Wakai et al. | | |
| 5,289,174 A | * | 2/1994 | Suzuki | ...................... | 345/98 |
| 5,691,786 A | * | 11/1997 | Nakai | ...................... | 349/39 |
| 5,965,906 A | * | 10/1999 | Park | ...................... | 257/59 |
| 6,219,113 B1 | * | 4/2001 | Takahara | ...................... | 345/98 |
| 6,515,720 B1 | * | 2/2003 | Iizuka et al. | ...................... | 349/39 |

* cited by examiner

Primary Examiner—Toan Ton
(74) Attorney, Agent, or Firm—Cantor Colburn LLP

(57) ABSTRACT

Peripheries of a contact 26 for connecting a polycrystalline silicon layer 20 to a pixel electrode 28 are cut by a laser to form a cut area 50. By this cut area 50, the polycrystalline silicon layer 20 around the contact 26 is also cut. In consequence, a TFT 24 is separated from the pixel electrode 28 and a supplemental capacitor electrode 32 to reliably accomplish darkening.

8 Claims, 4 Drawing Sheets

METHOD FOR DARKENING PIXEL

BACKGROUND OF THE INVENTION

1. Field of the Invention

The present invention relates to a method for darkening a pixel by which a thin film transistor disposed for each pixel is used to darken a defective pixel on a display device for controlling the application of a voltage to a corresponding pixel electrode.

2. Description of the Related Art

Heretofore, as flat display devices, there have been liquid crystal displays (LCDs), which have advantages such as a low dissipation power and a thin structure, and therefore, they are widely utilized as display devices for various electrical appliances.

As these kind of LCDs, products of an active matrix type have been increasing in which a thin film transistor (TFT) is disposed corresponding to each of pixels arranged in a matrix state and which controls the display of the corresponding pixel by turning this thin film transistor ON and OFF.

However, in such an LCD of the active matrix type, if a defect, for example, leakage current, occurs in the thin film transistor during a manufacturing process, the display of this pixel is impossible. Furthermore, also owing to short circuit of a supplemental capacitive electrode and an supplemental capacitive line, the display of this pixel is impossible. At this time, a defect of one pixel unit (a point defect) occurs.

In the case of such a defect of one pixel unit, if this point is a dark point (black), it is not noticeable, but if this point is a bright point (white) and if the pixel is surrounded with black pixels, there is a problem that the defective pixel is very noticeable. Accordingly, it is required to darken the defective pixel.

In the LCD of a usual normally white mode which is the mainstream of a twisted nematic (TN) LCDs, it is necessary for the display of the operationally defect pixel to be blackened by always applying an ON voltage to a liquid crystal. Therefore, connection between the TFT and a pixel electrode is cut, and both electrodes for the supplemental capacitor for holding the applied voltage are shorted to always apply the voltage to the pixel electrode.

On the other hand, with the amplification of the display, it is required to widen a visual field angle of the display, and a vertical orientation type LCD which is less dependent on the visual field angle of the display is being developed. This vertical orientation type LCD takes the display of normally black mode. Thus, even in such an LCD of the normally black mode, it is necessary to properly repair a point defect.

SUMMARY OF THE INVENTION

An object of the present invention is to provide a method for effectively darkening an operationally defect pixel in a normally black LCD.

In the present invention, a connection position between a contact and a pixel electrode is cut by a laser. Therefore, the pixel electrode can be reliably opened, whereby the application of a voltage to the pixel electrode can be prevented to darken this pixel.

Furthermore, an electrode of a thin film transistor in the vicinity of the contact can be cut by the laser, so that the thin film transistor side of the contact is also cut to completely electrically separate the contact, thereby reliably preventing the application of the voltage to the pixel electrode via the contact. Moreover, also in the case where a short occurs on an supplemental capacitive line, the voltage of supplemental capacitive line can be reliably prevented from being applied to a data line via the thin film transistor.

Furthermore, the above-mentioned display device is suitably a liquid crystal display device of the normally black type.

In addition, a liquid crystal display device according to the present invention includes a pixel darkened by the above-mentioned method.

DETAILED DESCRIPTION OF PREFERRED EMBODIMENT OF THE INVENTION

Next, embodiments of the present invention will be described with reference to drawings.

Figure 1:
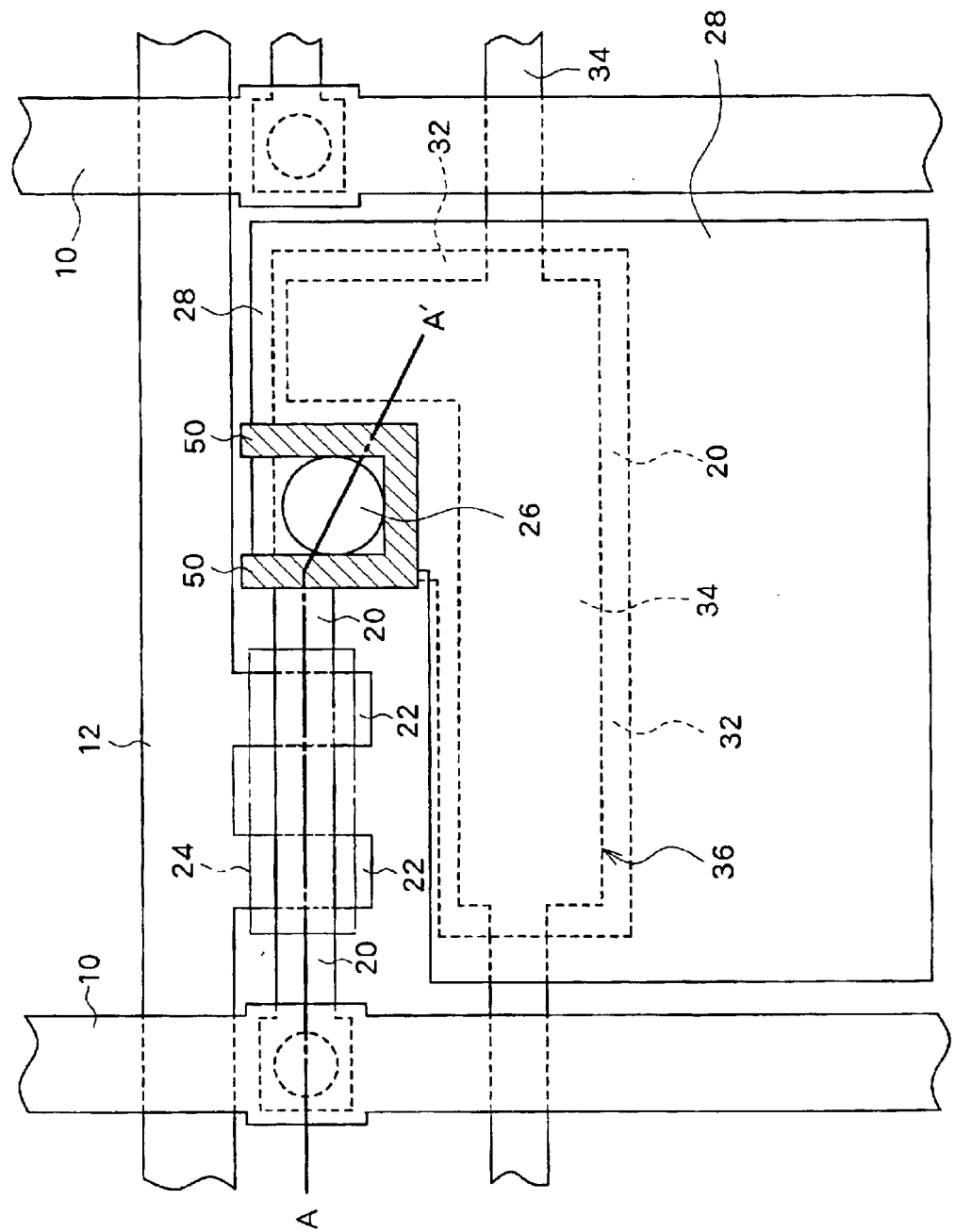
FIG. 1 is a plan view showing the constitution of an embodiment.

FIG. 1 is a plan view showing the structure of a darkened pixel regarding the present invention. A plurality of data lines 10 in a vertical direction and a plurality of gate lines 12 in a horizontal direction are disposed with a predetermined space between them, and a range surrounded these lines defines one pixel. The data line 10 is connected to one end of a polycrystalline silicon layer 20 extending in parallel with the gate line 12 in the vicinity of an intersection between the data line 10 above the pixel and the gate line 12. Under the polycrystalline silicon layer 20, there are disposed gate electrodes 22 formed so as to protrude from the gate line 12. In this embodiment, the two gate electrodes 22 are formed, and at positions of the polycrystalline silicon layer 20 corresponding to these gate electrodes 22, channel regions are provided which are not doped with any impurity, whereby a thin film transistor (TFT) of a double gate type is formed. That is to say, in this embodiment, the TFT 24 is an N channel, and the data line 10 side of the polycrystalline silicon layer 20 is a drain of the TFT 24, and the opposite side thereof is a source. It is to be noted that the TFT 24 of a P channel type may be employed. Furthermore, small amount of impurity may be doped to the channel regions. In the drawing, a region corresponding to the TFT 24 is shown by a rectangle of an alternate long and short dash line.

The source of the TFT 24 is connected to a pixel electrode 28 made of ITO (indium tin oxide) via a contact 26. In the embodiment of FIG. 1, a pixel electrode 28 is formed substantially over the whole pixel region surrounded by the data line 10 and the gate line 12 except the region at which the TFT 24 is formed. Thus, when a voltage is applied to this pixel electrode 28, the voltage is applied to a liquid crystal present between the pixel electrode 28 and an opposite common electrode (in the drawing, the front side of the paper), whereby display is controlled for every pixel.

Furthermore, a tip of the source of the polycrystalline silicon layer 20 extends to a portion of the pixel region (in the drawing, an upper region of the pixel), and becomes a supplemental capacitor electrode 32 formed integrally with the polycrystalline silicon layer 20. At a position opposite to the supplemental capacitor electrode 32 (a lower layer opposite to the pixel electrode 28), a supplemental capacitor line (an SC line) 34 is arranged, and a portion where two of them are superposed constitutes a supplemental capacitor 36. In consequence, the source of the TFT 24 is connected to the supplemental capacitor 36.

Figure 2:
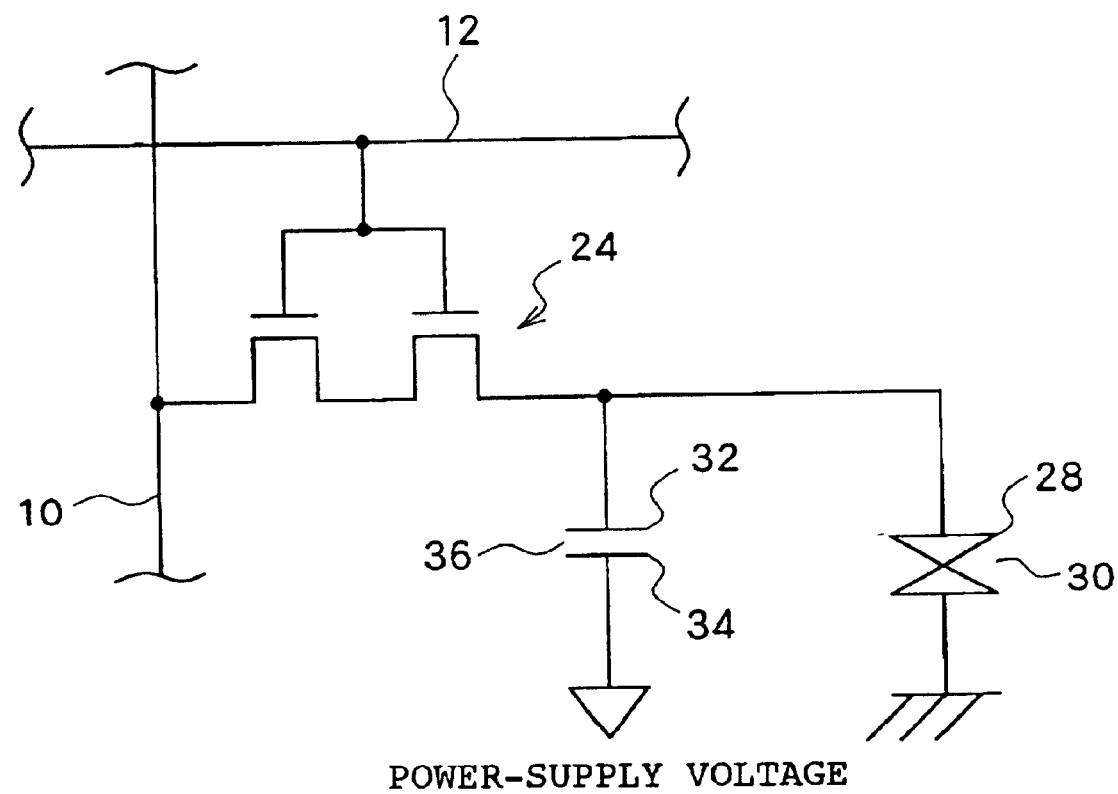
FIG. 2 is a view showing an equivalent circuit.

FIG. 2 shows an equivalent circuit in the constitution of FIG. 1. As will be understood from the above, the data line 10 is connected to the supplemental capacitor 36 and a liquid crystal pixel 30 via the TFT 24. Additionally, a gate of the TFT 24 is connected to the gate line 12. It is to be noted that the other end of the supplemental capacitor 36 is connected to a power source line to which a predetermined voltage is applied.

When a scanning signal at a high level is applied to the gate line 12, the TFT 24 turns on, and at this time, a data signal sent to the data line 10 is charged into the supplemental capacitor 36, and a corresponding voltage is applied to the liquid crystal 30 via the pixel electrode 28. Here, the LCD of this embodiment is a vertical orientation type LCD, and the above liquid crystal is a normally black (NB) liquid crystal which does not transmit light in a state where no voltage is applied thereto and which transmit the light in a state where the voltage is applied thereto. Therefore, when the voltage is applied to the liquid crystal 30, this point becomes a bright point (white display).

Figure 3:
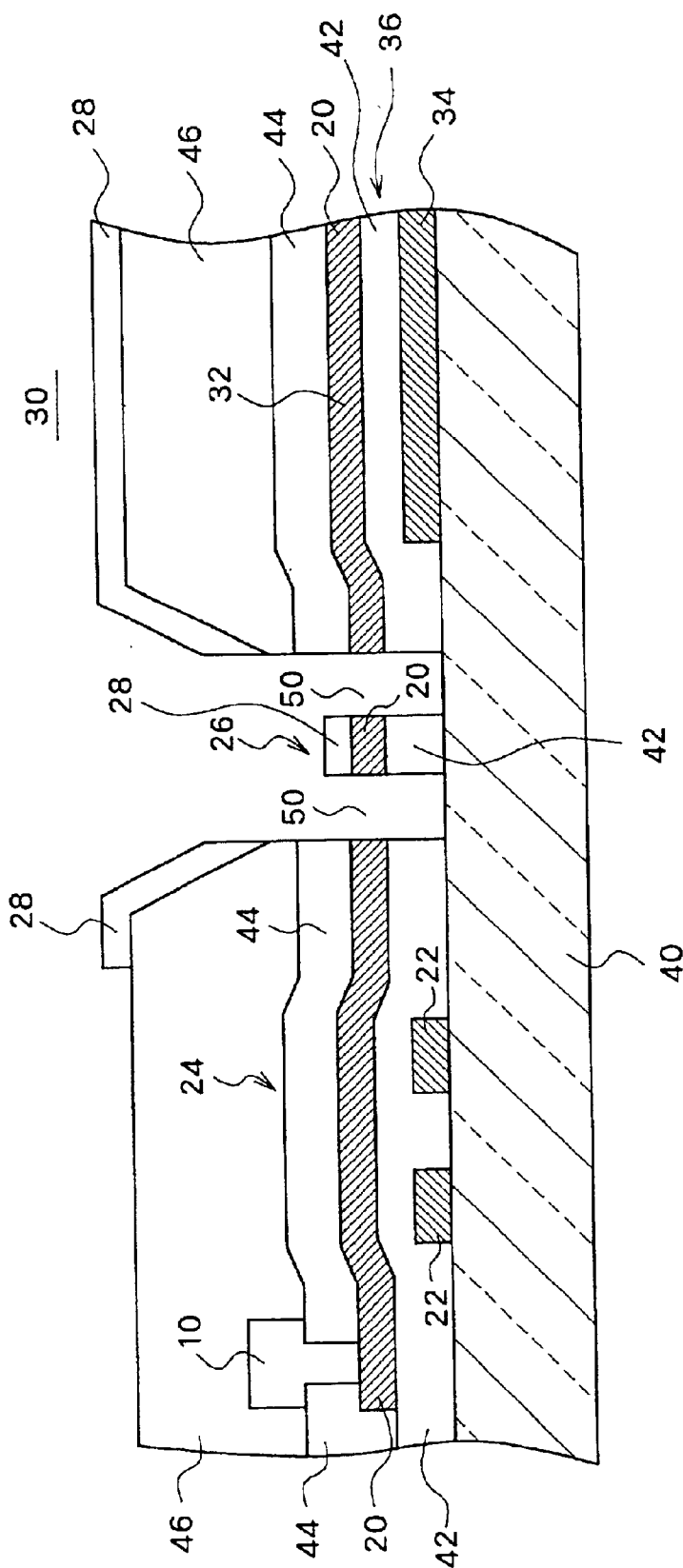
FIG. 3 is a sectional view cut along the line A–A' in FIG. 1.

FIG. 3 shows a section cut along the line A–A' in FIG. 1. As will be understood from the drawing, the gate electrode 22 and the supplemental capacitor line (the SC line) 34 are formed at predetermined regions on a glass substrate 40. Moreover, they are covered with a gate insulating film 42, and on this insulating film 42, the polycrystalline silicon layer 20 is disposed. On this polycrystalline silicon layer 20, an interlayer insulating layer 44 is formed, and in order to flatten the upper surface of the interlayer insulating layer 44, a flattening insulating layer 46 is further formed thereon. A contact hole is formed through the flattening insulating layer 46 and the interlayer insulating layer 44, and an ITO film is then formed all over the flattening insulating layer 46 containing the contact hole, followed by patterning, to obtain the pixel electrode 28 which has a plane shape as shown in FIG. 1 and which is connected to the corresponding TFT 24 via the contact 26 as shown in FIG. 3. In addition, a vertical orientation film, not shown, is formed all over the substrate containing the pixel electrode 28. Then, the substrate on which the TFT is formed is laminated via a predetermined gap on an opposite substrate on which the common electrode and the vertical orientation film are formed, a liquid crystal is poured into the gap and it is then sealed to obtain a complete LCD cell.

In this embodiment, when a defect occurs in the pixel, the polycrystalline silicon layer 20 and the pixel electrode 28 around the contact 26 are cut by a laser to form a cut area 50 as shown in FIG. 1. That is to say, the contact 26 is disposed at a connecting position with the polycrystalline silicon layer 20 in the vicinity of the top end of the pixel electrode 28 (a position near to the gate line 12), and except the upper portion of the contact 26 in the drawing, three portions of left, right and the underside of the contact 26 are cut into a U-shaped form to electrically separate the contact 26 from the other portions. In consequence, this constitution permits the TFT 24 to be electrically cut from the pixel electrode 28 and the supplemental capacitor electrode 32. For this cut processing, a YAG laser is used, and this processing is performed for all defective pixels of the LCD.

That is to say, for the finished LCD, a display test for each pixel is made. When the defective pixel is found in this test, the pixel is subjected to the processing of darkening by laser repairing.

In this embodiment, the polycrystalline silicon layer 20 has a relatively narrow belt shape in the portion of the TFT 24 corresponding to a protruded length of the gate electrodes 22 from the gate line 12 and has a large area at a portion which becomes the supplemental capacitor electrode 32. Therefore, the supplemental capacitor electrode 32 has an L shape overall which is formed by cutting off the rectangular portion on a left upper side in FIG. 1 where the TFT 24 is present. In the upper layer region in the cut portion, the TFT 24 is positioned, and the polycrystalline silicon layer 20 has a U shape overall. The pixel electrode 28 extends to boundaries of the supplemental capacitor electrode 32 and the TFT 24, and the contact 26 is arranged just at the boundary on the right side of this TFT 24. Therefore, the pixel electrode 28 and the supplemental capacitor electrode 32 on two sides of the right and the underside of the contact 26 in the drawing are cut by the laser to separate the contact 26 from the pixel electrode 28 and to separate the contact 26 from the supplemental capacitor electrode 32. Furthermore, the polycrystalline silicon layer 20 on the left side (on the side of the TFT 24) of the contact 26 in the drawing is cut by the laser to separate the contact 26 from the TFT 24.

As will be understood from the above, the contact 26 is electrically completely separated, whereby the pixel electrode 28 can be reliably opened, so that a high voltage is applied to the pixel electrode 28 which applies the voltage to the liquid crystal 30, whereby the defect pixel is always reliably prevented from displaying white.

Here, even if either of the TFT 24 side portion and the pixel electrode 28 side portion of the contact 26 is cut, the application of the voltage to the pixel electrode 28 can be prevented. However, when the TFT 24 side portion alone is cut, no effect is exerted in the case of the occurrence of a bright point by short of the SC line 34 and the polycrystalline silicon layer 20. Therefore, it is important that the pixel electrode 28 side portion of the contact 26 is cut. In addition, when both the portions are cut, the corresponding pixel can usually be darkened even in the case of one cut failure, and the probability of the occurrence of the bright point due to the cut failure can be sufficiently lowered.

Furthermore, the TFT of the LCD in this embodiment is formed in accordance with self alignment by the utilization of light exposure from a back surface. That is to say, in a state where a resist is deposited on the polycrystalline silicon layer 20, the portion of the resist on which the gate electrodes 22 is not present is removed by the light exposure from the back surface of the glass substrate 40, and the portion from which the resist has been removed is then doped with an impurity.

Therefore, also in the portion shaded by the SC line 34 during the back surface exposure, the resist remains as in the case of the portion (a channel portion) shaded by the gate electrodes 22. In consequence, the portion of the supplemental capacitor electrode 32 opposite to the SC line 34 is not doped with any impurity. Accordingly, an electrical resistance of the supplemental capacitor electrode 32 becomes relatively large.

Thus, in order to sufficiently increase a remaining charge quantity in the supplemental capacitor 36, the SC line 34 is usually set to a power-supply voltage. Therefore, in the case that the SC line 34 and the polycrystalline silicon layer 20 are shorted together, and if the TFT 24 is ON, the power-supply voltage is applied to the data line 10, whereby the display of other pixels connected to the data line 10 may be badly affected. When the TFT 24 side portion of the contact 26 is cut, the occurrence of such an accident can be reliably prevented.

It is to be noted that, in the above embodiment, the TFT 24 is constituted into a double gate and bottom gate type in which the two gate electrodes 22 protrude under the straightly extended polycrystalline silicon layer 20, but the TFT 24 is not limited to this constitution. Therefore, a single gate type may be used, or a top gate constitution in which the gate line 12 crosses over the polycrystalline silicon layer 20 may be employed.

Figure 4:
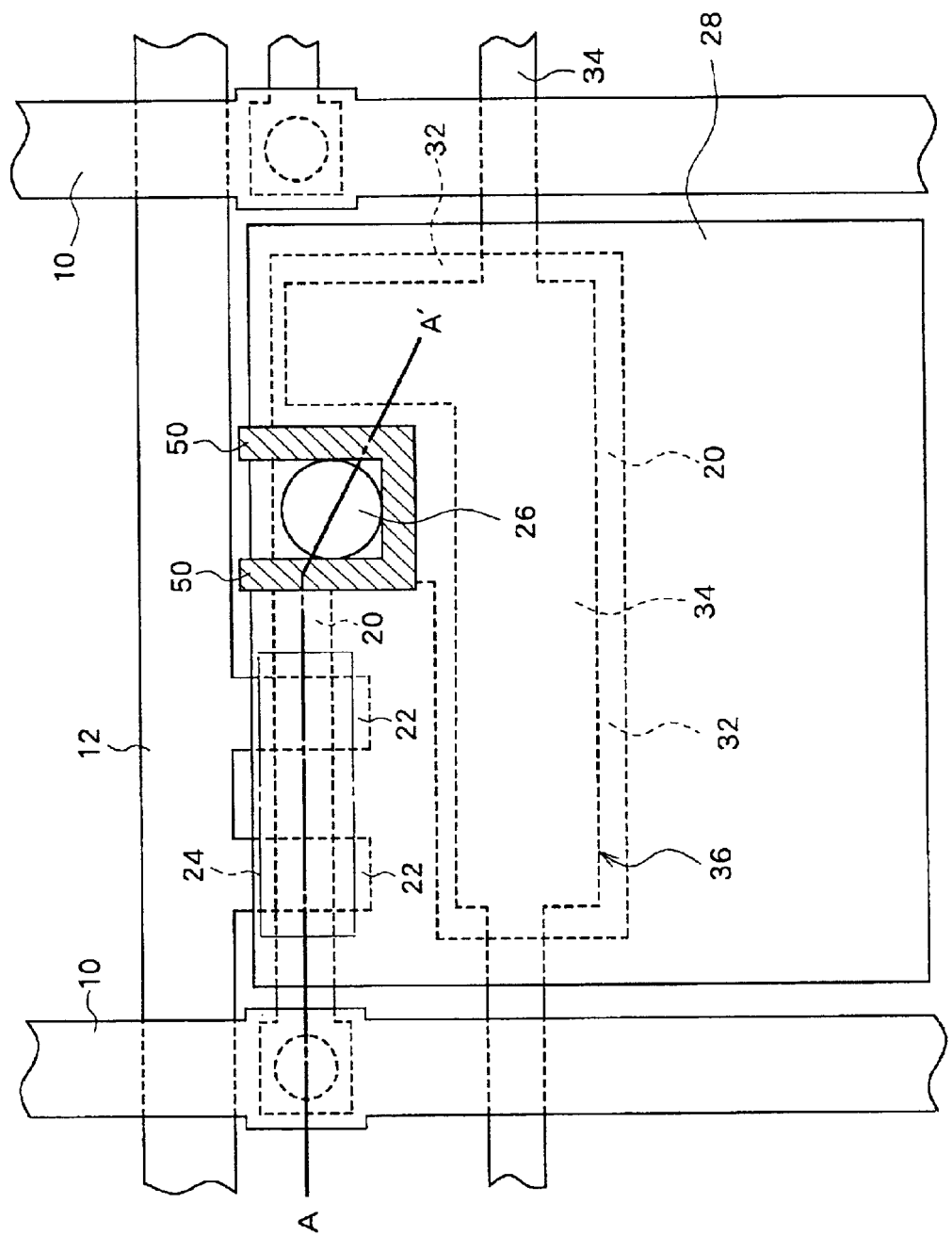
FIG. 4 is a plan view showing the constitution of another embodiment.

Furthermore, as shown in FIG. 4, the pixel electrode 28 may be provided so as to extend over the entire pixel region including the upper portion of the TFT 24. In such a constitution, the pixel electrode 28 is connected to the contact 26 on the underside and both right and left sides of the contact 26. Therefore, it is necessary that the pixel electrode 28 should always be cut on the underside and both the right and left sides of the contact 26 by the laser to form a cut area 50. Additionally, in this cut area 50, the polycrystalline silicon layer 20 is also cut.

Furthermore, the LCD of the TFT type includes various kinds such as a reflective type, but in any case, the pixel electrode 28 is connected to the TFT 24 via the contact 26. In consequence, in the LCD of any type, the effective darkening can be accomplished by the technique in which the contact 26 is separated in this embodiment, if the LCD is the normally black type.

Additionally, also in an EL display such as an organic EL (electroluminescence) type, instead of the LCD, the constitution of this embodiment can be employed. In this case, an anode (or a cathode) of an EL element is connected to the TFT for display control via the contact. Therefore, this anode (or the cathode) is connected to the TFT electrically separating the contact, whereby the voltage application of the EL element of a diode constitution across the anode and the cathode can be inhibited and hence, the darkening of the pixel can be attained.

What is claimed is:

1. A method for darkening a pixel by darkening a defective pixel on a display for controlling the application of a voltage to a corresponding pixel electrode by a thin film transistor disposed for each pixel, wherein:

a pixel electrode is formed on an insulating layer which is provided on an electrode of the thin film transistor, and the electrode of the thin film transistor and the pixel electrode are connected via a contact formed through the insulating layer; and a part of the pixel electrode is cut by a laser in the vicinity of the contact connecting an electrode of the thin film transistor to the pixel electrode to separate the contact from the pixel electrode and to thereby darken the corresponding pixel wherein the thin film transistor is not destroyed.

2. The method for darkening the pixel according to claim 1, wherein the electrode of the thin film transistor in the vicinity of the contact is further cut by the laser to separate the contact from the thin film transistor.

3. The method for darkening the pixel according to claim 1, wherein the display device is a liquid crystal display of a normally black type.

4. The method for darkening the pixel according to claim 1, wherein the pixel electrode on the contact is an island-like conductive portion separated from an ambience.

5. A display device for controlling, by the thin film transistor disposed for each pixel, the application of a voltage to a corresponding pixel electrode, wherein:

a pixel electrode is formed on an insulating layer which is provided on an electrode of the thin film transistor, and the electrode of the thin film transistor and the pixel electrode are connected via a contact formed through the insulating layer; and a part of the pixel electrode is cut by a laser in the vicinity of the contact connecting an electrode of the thin film transistor to the pixel electrode to separate the contact from the pixel electrode and to thereby darken the corresponding pixel wherein the thin film transistor is not destroyed.

6. The display device according to claim 5, wherein the electrode of the thin film transistor in the vicinity of the contact is further cut by the laser to separate the contact from the thin film transistor.

7. The display device according to claim 5, wherein the display device is a liquid crystal display of a normally black type.

8. The display device according to claim 5, wherein the pixel electrode on the contact is an island-like conductive portion separated from an ambience.

* * * * *